United States Patent
Lindoff et al.

(10) Patent No.: US 11,109,386 B2
(45) Date of Patent: Aug. 31, 2021

(54) METHOD AND APPARATUS FOR HANDLING INTERFERENCE CAUSED BY INTER-MODULATION

(71) Applicant: Telefonaktiebolaget LM Ericsson (publ), Stockholm (SE)

(72) Inventors: Bengt Lindoff, Bjarred (SE); Bo Hagerman, Morristown, NJ (US); David Eriksson, Knivsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 443 days.

(21) Appl. No.: 16/085,979

(22) PCT Filed: Mar. 18, 2016

(86) PCT No.: PCT/EP2016/055975
§ 371 (c)(1),
(2) Date: Sep. 17, 2018

(87) PCT Pub. No.: WO2017/157461
PCT Pub. Date: Sep. 21, 2017

(65) Prior Publication Data
US 2020/0296729 A1   Sep. 17, 2020

(51) Int. Cl.
*H04W 72/08* (2009.01)
*H04W 72/04* (2009.01)
*H04W 72/12* (2009.01)

(52) U.S. Cl.
CPC ....... *H04W 72/082* (2013.01); *H04W 72/042* (2013.01); *H04W 72/0413* (2013.01); *H04W 72/0446* (2013.01); *H04W 72/1231* (2013.01)

(58) Field of Classification Search
CPC .......... H04W 72/082; H04W 72/0413; H04W 72/042; H04W 72/0446
See application file for complete search history.

(56) References Cited

U.S. PATENT DOCUMENTS

| | | | |
|---|---|---|---|
| 2010/0202416 A1* | 8/2010 | Wilhelmsson | H04W 72/1215 370/336 |
| 2011/0045831 A1 | 2/2011 | Chiu et al. | |

(Continued)

OTHER PUBLICATIONS

PCT International Search Report, dated Nov. 18, 2016, in connection with International Application No. PCT/EP2016/055975, all pages.

(Continued)

*Primary Examiner* — Jael M Ulysse
(74) *Attorney, Agent, or Firm* — Sage Patent Group

(57) ABSTRACT

There is provided a method of handling interference caused by inter-modulation in a network node site comprising a set of network nodes for wireless communication capable of communication with a set of stations for wireless communication. The stations are wireless transceiver devices and communication from the network node to any of the stations is considered to be downlink communication and communication from any of the stations is considered to be uplink communication. The method comprises detecting likely passive intermodulation, determining at least one station having an uplink resource being a likely to be affected by the detected likely passive intermodulation, and limiting downlink transmission, when the determined at least one station is scheduled or expected to transmit on the uplink resource, on a downlink resource likely to be affecting the uplink resource by the detected likely passive intermodulation. A computer program, a controller and a network node site are also disclosed.

20 Claims, 5 Drawing Sheets

(56) References Cited

U.S. PATENT DOCUMENTS

| | | | | |
|---|---|---|---|---|
| 2011/0081932 A1* | 4/2011 | Astely | ............... | H04L 5/0053 455/509 |
| 2011/0158211 A1* | 6/2011 | Gaal | ............... | H04L 27/2647 370/338 |
| 2012/0257519 A1* | 10/2012 | Frank | ............... | H04W 52/16 370/252 |
| 2013/0044621 A1* | 2/2013 | Jung | ............... | H04L 5/0007 370/252 |
| 2013/0083672 A1* | 4/2013 | Johansson | ............... | H04W 72/082 370/252 |
| 2013/0203432 A1* | 8/2013 | Wang | ............... | H04W 72/02 455/452.1 |
| 2013/0310090 A1* | 11/2013 | Bevan | ............... | H04B 1/10 455/501 |
| 2013/0322395 A1* | 12/2013 | Kazmi | ............... | H04W 72/082 370/329 |
| 2014/0036736 A1* | 2/2014 | Wyville | ............... | H04B 1/525 370/278 |
| 2014/0199993 A1 | 7/2014 | Dhanda et al. | | |
| 2014/0274179 A1* | 9/2014 | Zhu | ............... | H04W 52/243 455/509 |
| 2014/0301498 A1* | 10/2014 | Rimini | ............... | H04B 1/12 375/285 |
| 2015/0257165 A1* | 9/2015 | Gale | ............... | H04W 72/0453 370/329 |
| 2015/0350940 A1* | 12/2015 | Wilson | ............... | H04B 1/1027 370/252 |
| 2015/0358144 A1* | 12/2015 | Fleischer | ............... | H04B 17/19 370/242 |
| 2016/0006468 A1* | 1/2016 | Gale | ............... | H04B 1/1036 455/296 |
| 2016/0142229 A1* | 5/2016 | Bevan | ............... | H04L 25/03006 455/307 |
| 2016/0249365 A1* | 8/2016 | Harel | ............... | H04W 72/085 |
| 2016/0366605 A1* | 12/2016 | Tsui | ............... | H04B 17/0085 |
| 2017/0064591 A1* | 3/2017 | Padfield | ............... | H04W 36/20 |
| 2017/0237484 A1* | 8/2017 | Heath | ............... | H04B 10/07953 398/26 |

OTHER PUBLICATIONS

PCT Written Opinion, dated Nov. 18, 2016, in connection with International Application No. PCT/EP2016/055975, all pages.

3GPP TR 37.808 V12.0.0, Sep. 2013, 3rd Generation Partnership Project; Technical Specification Group Radio Access Network; Passive Intermodulation (PIM) handling for Base Stations (BS), Release 12, 27 pages.

\* cited by examiner

METHOD AND APPARATUS FOR HANDLING INTERFERENCE CAUSED BY INTER-MODULATION

TECHNICAL FIELD

The present invention generally relates to a method of handling interference caused by inter-modulation in a network node site comprising a set of network nodes for wireless communication capable of communication with a set of stations for wireless communication, a computer program for implementing the method, to such network node site and to a controller for the handling of the interference.

BACKGROUND

In wireless communication systems, interference by radio frequency (RF) transmitters for RF communication systems may become an issue.

The purpose of a transmitter in a digital wireless communication system is to convert a digital low-frequency baseband signal into an RF signal while preserving the modulation, and thereby the baseband information. In a full duplex system, a radio receives and transmits information simultaneously, which may be performed according to frequency duplex division (FDD), i.e. the radio transmits on one frequency and receives on another frequency. This means that, despite the fact that receive (RX) and transmit (TX) signals are spaced in frequency by a duplex distance, distortion products caused by nonlinearities in the transmitter may fall into the receive band and raise the over-all receiver noise figure, as well as discomply with a transmit spectrum mask. In order to reduce this effect, external cavity filters may be used in radio base stations (RBS) to filter out unwanted components outside wanted transmission band. However, intermodulation products caused by multiple transmitted signals, e.g. own TX signal in combination with an interferer signal, may also position unwanted tones in the receive band and thus degrade the receiver signal-to-noise-ratio (SNR). These unwanted tones are not possible to filter out by frequency filtering and they are thus to be handled by the receiver.

In a multi operator FDD RBS site solution, each operator uses a unique paired spectrum and the spectrum parts thus become separated in frequency not to interfere with each other's operations. There is no joint scheduling required among the operators, resulting in that simultaneous transmissions may occur. However, due to non-linear effects caused by for instance excitation of ferromagnetic materials or other physical properties, e.g. metal oxidation, mechanical disruptions, etc., passive intermodulation (PIM) products may be reflected back to or within the RBS site and fall into one of the operator's receive band and cause desensitization. As a result, the created PIM products caused by the multi operator transmissions may result in lowered received uplink SNR for some scenarios. The problem may also arise in the case when the same operator uses two different carrier frequencies, e.g. operating in carrier aggregation setup, in any direction. The problem may also affect or be affected by frequencies used for time division duplex (TDD) upon such relations between frequencies.

A normal operation to handle such problems would be to send a service technician to the RBS site to try to find the cause and replace or mend the causing element. However, such an operation may take a while, and there may be a not fully functioning RBS for a longer or shorter time.

Approaches for compensating at the receiver are also contemplated. For example, US 2014/036736 discloses an approach for compensation for Passive Intermodulation (PIM) distortion in a receiver. A main receiver receives a radio frequency receive signal and outputs a main receiver output signal. In order to compensate for PIM distortion, a tuneable non-linear circuit generates an Intermodulation Products (IMP) signal that includes a number of IMPs as a function of a signal that is indicative of the radio frequency transmit signal. An auxiliary receiver receives the IMP signal and outputs an auxiliary receiver output signal that includes only a subset of the IMPs that fall within a passband of the main receiver. The auxiliary receiver output signal is adaptively filtered to provide a PIM estimate signal, which is then subtracted from the main receiver output signal to provide a compensated output signal.

In the case when two FDD downlink bands are separated by the same frequency distance as the duplex distance for one of the FDD receiver frequencies, third order PIM products may become collocated within a receive band without the possibility to be suppressed by filtering as discussed above. As a result, the noise level of the affected receiver will increase and lower received SNR in the uplink.

An example is illustrated in FIG. 1 where two transmitted signals 100, 102, for example 3GPP frequency band 29 and band 17, from the same RBS give rise to a PIM product 104, in this case due third order intermodulation, i.e. at $2 \cdot f1 - f2$, where f1 is the frequency of transmission in B17 and f2 is the transmission frequency in band 29, falling into the receive band 106 of band 17. As a result, in the band 17 the receiver will lower its sensitivity and face reduced coverage. Continuing this example with reference to FIG. 2, a base station 200 is operating a cell 202. The lowered sensitivity will decrease the possible coverage of the cell to a limited coverage 204. This could potentially lead to dropped connections or limited application coverage as illustrated by UE A 206 in FIG. 2, while for UEs closer to the network node 200, e.g. UE B 208, the communication may still work. This may lead to the operator missing traffic (to be billed) and/or less satisfaction by subscribers.

This may become more and more of a problem the more bands that are available, since with the more bands there will be larger risks for co-sited RBSs for different operators, which may create PIM affecting any of the operators' receive bands. For the sake of brevity and easier understanding, the issue has been demonstrated above where inter-modulation is caused by two frequencies, but the similar effects may arise from further used frequencies, and used frequencies inter-modulating with inter-modulation products, and so on. That is, the more frequencies used at a network node site, the more likely is it that an inter-modulation product affects a receive band. It is therefore a desire to detect such situations to be able to handle them.

SUMMARY

The invention is based on the inventors' realization that identification of passive intermodulation issues enables adaptations to limit the effect of them by adapting transmissions when receptions likely to be affected are to be made.

According to a first aspect, there is provided a method of handling interference caused by inter-modulation in a network node site comprising a set of network nodes for wireless communication capable of communication with a set of stations for wireless communication. The stations are wireless transceiver devices and communication from the network node to any of the stations is considered to be downlink communication and communication from any of the stations is considered to be uplink communication. The method comprises detecting likely passive intermodulation, determining at least one station having an uplink resource being a likely to be affected by the detected likely passive intermodulation, and limiting downlink transmission, when the determined at least one station is scheduled or expected to transmit on the uplink resource, on a downlink resource likely to be affecting the uplink resource by the detected likely passive intermodulation.

The determining of at least one station may comprise forming at least one group of stations, wherein the stations of the group are assigned the uplink resource being likely to be affected by the detected likely passive intermodulation. A plurality of groups of stations may be determined, and each group may be assigned a level of protection, wherein the limiting of the downlink transmission may be performed according to the level of protection. A group of stations may comprise stations which are assigned to report in a same subframe of the uplink resource. The same subframe may be an actual same subframe and/or a same recurring subframe of the assigned resource.

The limiting of the downlink transmission may comprise adapting any one or more of transmit power, scheduled content to transmit, and resource block assignment for transmission.

The limiting of downlink transmission may comprise omitting transmission when the determined at least one station is scheduled or expected to transmit on the uplink resource.

The detecting of likely passive intermodulation may comprise providing an indication on likely passive intermodulation when there is significant interference caused by inter-modulation which is considered present based on a measurement, calculation of estimated passive intermodulation from the measurement, and comparison of the estimated passive intermodulation with a threshold. The calculation of the estimate of the passive intermodulation may comprise correlating measured interference levels at substantially full transmit power level for the network node and received input signal interference levels at substantially minimum transmit power level for the network node, wherein the passive intermodulation estimate is based on differences as different transmit power levels.

The detecting of likely passive intermodulation may comprise determining a received input signal interference level on at least a part of communication resources for uplink communication, determining a transmitted signal level on at least a part of communication resources for downlink communication, wherein the at least part of communication resources for downlink communication corresponds in time with the at least part of communication for uplink communication, correlating statistics from the determined received input signal interference level and the determined transmitted signal level, and determining whether significant interference caused by inter-modulation is present based on the correlation.

According to a second aspect, there is provided a computer program comprising instructions which, when executed on a processor of a controller at a network sire, causes the controller to perform the method according to the first aspect.

According to a third aspect, there is provided a controller arranged to operate with a network node site comprising a set of network nodes for wireless communication capable of communication with a set of stations for wireless communication. The stations are wireless transceiver devices and communication from the network node to any of the stations is considered to be downlink communication and communication from any of the stations is considered to be uplink communication. The controller comprises a detector arranged to detect likely passive intermodulation, an analyser arranged to determine at least one station having an uplink resource being a likely to be affected by the detected likely passive intermodulation, and a transmission control arranged to limit downlink transmission, when the determined at least one station is scheduled or expected to transmit on the uplink resource, on a downlink resource likely to be affecting the uplink resource by the detected likely passive intermodulation. The analyser may be arranged to determine the at least one station by forming at least one group of stations, wherein the stations of the group are assigned the uplink resource being likely to be affected by the detected likely passive intermodulation. A plurality of groups of stations may be determined, and each group may be assigned a level of protection, wherein the transmission control may be arranged to limit the downlink transmission according to the level of protection. A group of stations may comprise stations which are assigned to report in a same subframe of the uplink resource. The same subframe may be an actual same subframe and/or a same recurring subframe of the assigned resource.

The transmission control may be arranged to limit the downlink transmission by adapting any one or more of transmit power, scheduled content to transmit, and resource block assignment for transmission.

The transmission control may be arranged to limit the downlink transmission by omitting transmission when the determined at least one station is scheduled or expected to transmit on the uplink resource.

The detector may be arranged to detect likely passive intermodulation by providing an indication on likely passive intermodulation when there is significant interference caused by inter-modulation which is considered present based on a measurement, calculation of estimated passive intermodulation from the measurement, and comparison of the estimated passive intermodulation with a threshold. The detector may be arranged to calculate the estimate of the passive intermodulation by correlating measured interference levels at substantially full transmit power level for the network node and received input signal interference levels at substantially minimum transmit power level for the network node, wherein the passive intermodulation estimate is based on differences as different transmit power levels.

The detector may comprise an interference level detector arranged to determine a received input signal interference level on at least a part of communication resources for uplink communication, a transmit signal level monitor arranged to determine a transmit signal level on at least a part of communication resources for downlink communication, wherein the at least part of communication resources for downlink communication corresponds in time with the at least part of communication for uplink communication, a correlator arranged to correlate statistics from the determined received input signal interference level and the determined transmitted signal level, and an analytics circuit arranged to determine whether significant interference caused by inter-modulation is present based on the correlation.

According to a fourth aspect, there is provided a network node site comprising one or more network nodes for wireless communication capable of communication with a set of stations for wireless communication, and a controller according to the third aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Methods of detecting interference, a network (NW) node and computer programs for the same are disclosed below. The interference on topic is caused by inter-modulation in a NW node, or NW node site comprising a plurality of co-located NW nodes, for wireless communication with a set of stations for wireless communication. The term "co-located" should in this context include that the network nodes are located in the same spot or housing, as well at being in close neighbourhood such that signals from the network nodes may cause intermodulation products as discussed above. A station in this context may for example be a user equipment, UE, a modem, a cellphone, a smartphone, a computer or, any electric or electronic device capable of wireless communication with a NW node. More and more items we previously knew as rather simple objects are now capable of this, which has, and will, provide for some of the great improvements in many fields, even outside the conventional telecommunication industry. Examples are sensors, machines, medical equipment, monitoring devices, etc. that has been enhanced by being able to wirelessly communicate with wireless nodes of different wireless communication systems.

In this disclosure below, embodiments are exemplified within an 3GPP LTE context for the sake of easier understanding, but the invention is not limited to that Radio Access Technology (RAT). Other RATs, such as any of the commonly used technologies for public land mobile networks, may benefit from the invention in a similar way.

Generally, the below demonstrated approach is based on detecting whether a passive intermodulation (PIM) issue exists within an entity, and to take actions to limit the effects of the PIM issue. The detection of PIM issues may for example be made by correlating statistics from a determined received input signal interference level and determined transmitted signal levels. This may be performed for any relations between received signals and transmitted signals which are under control by the entity.

Figure 3:
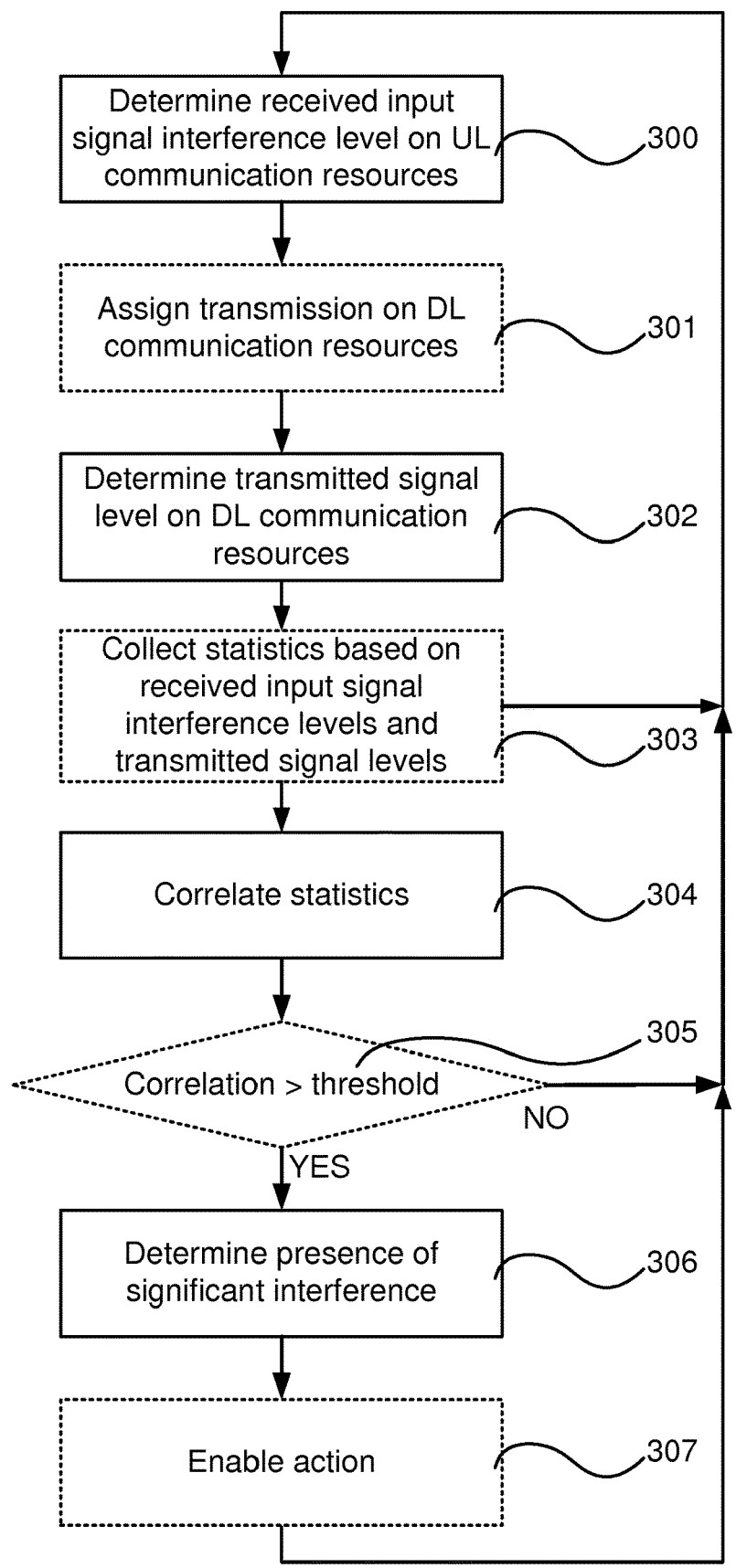
FIG. 3 is a flow chart schematically illustrating determination of passive intermodulation according to an example.

FIG. 3 is a flow chart illustrating a method of determination of passive intermodulation according to an example. The method includes determining 300 received input signal interference level on uplink, UL, communication resources. The UL communication resources may correspond to an entire transmission time interval or selected parts thereof. The selected parts thereof may be selected such that those parts do not include any data transmission which facilitates the determination of the interference level since the nominal signal level of the received signal then is reasonably known. If determination is to be made on signals including data transmissions, the determination may rely on statistics or other information to estimate the interference level. The determination 302 of interference level may also include "active" silence, i.e. the method may arrange that no schedule for an uplink transmission grant for the stations is made during a particular transmission time interval, wherein all received signal is some kind of interference.

The method also includes determining 302 a transmitted signal level on at least a part of communication resources for downlink communication. The at least part of communication resources for downlink communication should correspond in time with the at least part of communication for uplink communication to be able to determine if the transmitted signal affects the interference level of the received signal. The corresponding time may for example be defined by corresponding subframes or transmission time intervals.

Both the received signal and the transmitted signal should be known and/or under control of the entity performing the method. This may be the case when the entity is one network node. This may also be the case when more than one network node, where one does the receiving and another does the transmitting referred to above, are involved but are under control by e.g. a common controller. A network node in this context may operate on one or more frequency bands, e.g. one frequency band for receiving and transmitting, one frequency band for transmitting and receiving and another frequency band for transmitting or receiving, or one or more frequency bands for respective transmitting and receiving. Thus, the network node(s) may operate in time division duplex, TDD, frequency division duplex, FDD, and/or with carrier aggregation, wherein different relations may occur when a received channel may be interfered by inter-modulation from a transmitted channel in a network node site comprising a set of network nodes, i.e. one or more, capable of wireless communication with a set of stations for wireless communication.

For determining such relations where the received signal is interfered by inter-modulation introduced by a transmitted signal which is under control by the entity performing the method, the method correlates 304 statistics from the determined received input signal interference level and the determined transmitted signal level. This may be performed for any relations between received signals and transmitted signals which are under control by the entity performing the method.

Based on the correlations, it is determined 306 whether significant interference is caused by inter-modulation introduced by the transmitted signal which is under control by the entity performing the method. If such significant interference is determined present, a predetermined action may be taken 307. The predetermined action may for example include assigning communication resources such that communication is less affected by the interference.

The determination whether significant interference is caused, as stated above, may include comparing 305 a correlation metric value provided by the correlation 304 with a threshold, wherein a correlation metric value exceeding the threshold indicates that the significant interference is present while if the correlation metric value is below the threshold, the method continues to monitor 300, 302 received input signal interference levels and transmit signal levels.

Statistics based on the received input signal interference levels and transmitted signal levels may be collected 303 over time, as indicated by the arrow returning to the determination step 300, to provide sufficient statistics to correlate 304. The statistics may be collected locally or may be collected by aid of remote elements comprising database and processing means. For example, the element included in the PIM analysis may comprise an interface arranged to provide the determined received input signal interference level and transmitted signal level to a statistics mechanism of the remote element, or a statistics mechanism of the element involved in the PIM analysis. For making the correlation, the statistics to be correlated are received from the statistics mechanism and the correlations are then done.

The monitoring and building of statistics may for example be an ongoing process as transmissions and receptions are performed in the network node site while the correlating and determining may be performed periodically. However, the monitoring and building of statistics may also be made periodically, wherein the period for monitoring may be equal or shorter than the period for the correlating and determining whether significant interference is present.

To enhance the statistics, it may be desired to provide a variety of transmit signal levels to the monitored set. Therefore, transmission on the DL communication resources may be assigned such that this variation is achieved. This may comprise selecting the transmit level to e.g. substantially full transmit power level for the network node transmitting the signal for at least some of the time instants, and substantially minimum transmit power level for the network node transmitting the signal for at least some of the time instants. Full transmit power level may for example be provided by ensuring that the communication resources, which may be defined by time, frequency and/or code, are completely filled, which may require filling with dummy information. Minimum transmit power level may for example be provided by only transmitting mandatory reference signals etc. and possibly with reduced power level, i.e. not scheduling any traffic on the communication resources in question. The variation may also be achieved by normal variation in transmissions. The determination of transmitted signal level may for example be provided from information on utilization of the communication resources.

The above demonstrated example provides an efficient and accurate determination of whether PIM is present, but other approaches for determining PIM issues are equally feasible.

The detection of the PIM issues may further comprise determining which UE or UEs that are affected. Among the UEs which are in connected mode, uplink resources which are associated with those UEs and having interference correlating to downlink activities and having frequency relationships between the uplink and downlink frequencies where PIM is likely to occur can thus be identified, and thus likely victims. From this, the entity is now aware of which transmissions are likely to cause the PIM issues, and which UE or UEs are likely to be the victims.

Figure 4:
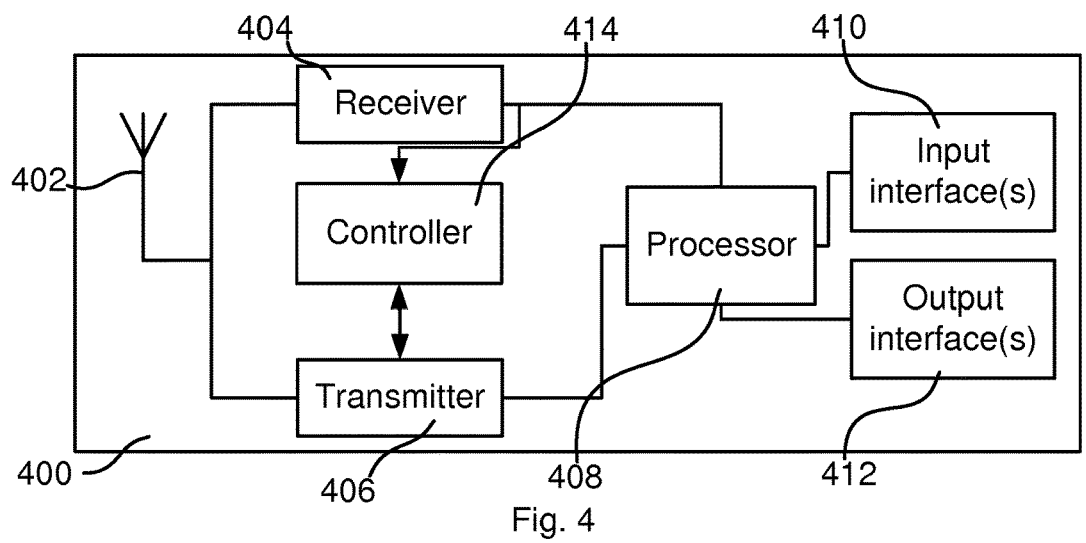
FIG. 4 is a block diagram schematically illustrating a network node site according to an embodiment.

By dividing the UEs in connected mode into at least two groups, the groups comprising 'protected group' and 'unprotected group', where the UEs of the protected group is assigned resources for uplink control transmissions, e.g. PUCCH, when correlated downlink transmissions are restricted such that PIM effects are reduced. FIG. 4 is a block diagram schematically illustrating a NW node 400 according to an embodiment. The NW node 400 comprises an antenna arrangement 402, a receiver 404 connected to the antenna arrangement 402, a transmitter 406 connected to the antenna arrangement 402, a processing element 408 which may comprise one or more circuits, one or more input interfaces 410 and one or more output interfaces 412. The interfaces 410, 412 can be user interfaces and/or signal interfaces, e.g. electrical or optical. The NW node 400 is arranged to operate in a cellular communication network, e.g. as a base station operating a cell. The processing element 408 can fulfill a multitude of tasks, ranging from signal processing to enable reception and transmission since it is connected to the receiver 404 and transmitter 406, executing applications, controlling the interfaces 410, 412, etc.

Figure 7:
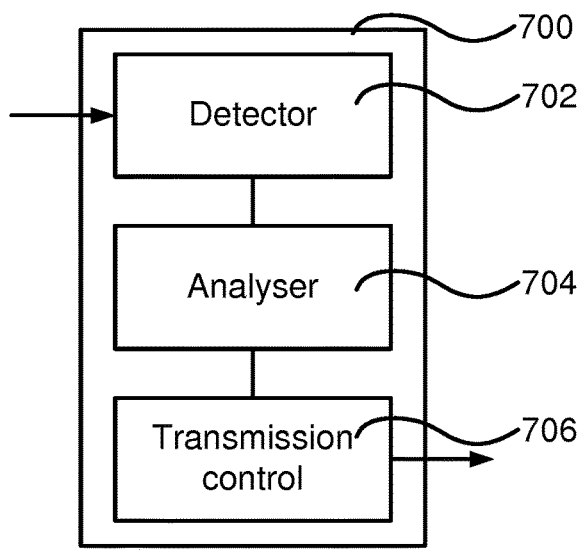
FIG. 7 is a block diagram schematically illustrating a controller according to an embodiment.

The NW node 400 may comprise a controller 414 arranged to handle some specific functions related to the method that will be demonstrated below. The controller 414 may be a separate element or be integrated in the processor 408. The controller 414, which will be further discussed with reference to FIG. 7, is arranged to detect likely PIM, and may comprise an interference level detector arranged to detect a received input signal interference level on at least a part of communication resources for uplink communication in an uplink carrier frequency band. The interference level detector may thus be connected to the receiver 404 to be able to gain levels and information for performing its task. The controller 414 may further comprises a transmit signal level monitor arranged to determine a transmit signal level on at least a part of communication resources for downlink communication. The transmit signal level may be determined from output of the transmitter 406, or be determined based on inputs and settings provided to or within the transmitter 406. At least part of communication resources for downlink communication corresponds in time with the at least part of communication for uplink communication such that they may be analysed. The controller 414 may further includes a correlator arranged to correlate statistics from the determined received input signal interference level and the determined transmitted signal level, and an analyser arranged to determine whether significant interference caused by inter-modulation is likely to affect an uplink resource when a station is scheduled or expected to transmit on the uplink resource, i.e. where the receiver 404 needs to be able to make a proper reception affected as little as possible by the PIM.

By these elements it is possible to determine whether the interference level indicates significant inter-modulation interference caused by transmissions made by the transmitter 406, i.e. by collecting statistics and performing correlation and evaluating them. The controller 414 may thus for example be considered to perform the steps 300 and 302 of FIG. 3 to enable collection of interference and signal levels for the statistics as demonstrated above, wherein the controller 414 is able to determine, by performing the correlations from the collected statistics, if significant inter-modulation issues caused by signals transmitted by the transmitter 406 exist. The controller 414 may further be arranged to, if "active" silence is required on the uplink for the measurements, arrange than no schedule for an uplink transmission grant for the other stations is made. The uplink transmission grant is valid for a future TTI. The controller 414, which is connected to the transmitter 406, may further be arranged to avoid the uplink transmission grant to the stations, and to limit transmissions on the downlink carrier frequency band at the future TTI such that measurements to collect desired statistics on inter-modulation interference is enabled on the uplink carrier frequency band, or perform receptions with limited PIM. The controller 414 is illustrated as a separate functional element, but may be implemented within the processing element 408 in some embodiments.

Figure 5:
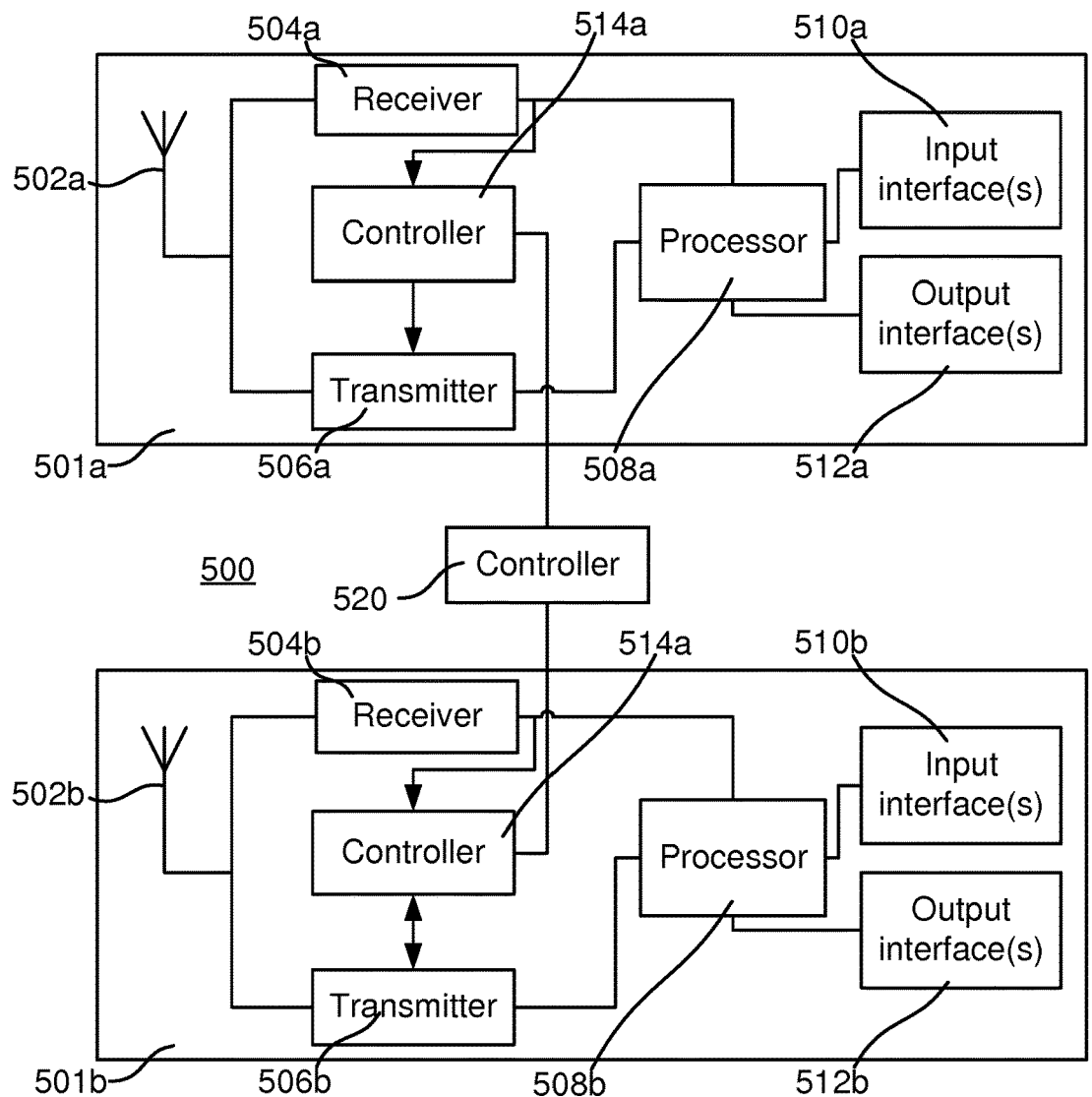
FIG. 5 is a block diagram schematically illustrating a network node site according to an embodiment.

FIG. 5 is a block diagram schematically illustrating a NW node site 500 according to an embodiment. The NW node site 500 comprises two or more co-located NW nodes 501a, 501b and a NW node site controller 520. The NW nodes 501a, 501b resembles the NW node 400 demonstrated with reference to FIG. 4. That is, the NW nodes 501a, 501b each comprises an antenna arrangement 502a, 502b, a receiver 504a, 504b connected to the antenna arrangement 502a, 502b, a transmitter 506a, 506b connected to the antenna arrangement 502a, 502b, a processing element 508a, 508b which may comprise one or more circuits, one or more input interfaces 510a, 510b and one or more output interfaces 512a, 512b. The antenna arrangements 502a, 502b may be a common antenna arrangement for the network nodes 501a, 501b. The interfaces 510a, 510b, 512a, 512b can be user interfaces and/or signal interfaces, e.g. electrical or optical. The NW nodes 501a, 501b may be arranged to operate in a cellular communication network, e.g. as a base station operating a cell. The processing element 508a, 508b can also fulfill a multitude of tasks, ranging from signal processing to enable reception and transmission since it is connected to the receiver 504a, 504b and transmitter 506a, 506b, executing applications, controlling the interfaces 510a, 510b, 512a, 512b, etc. The NW nodes 501a, 501b each may comprise a controller 514a, 514b arranged to detect an interference level on the uplink carrier frequency band for a subset of stations of the set of stations. The controllers 514a, 514b are thus connected to the receivers 504a, 504b, respectively, to be able to gain levels and information for performing its task. The controllers 514a, 514b are illustrated as separate functional elements, but may be implemented within the processing elements 508a, 508b or in the common NW node site controller 520 in some embodiments. The controllers 514a, 514b may alternatively be considered to be more or less only interfaces towards the NW node site controller 520 which may perform the activities. Alternatively, the NW node site controller 520 may be considered to be more or less only an interface between the controllers 514a, 514b, which may perform the activities and exchange necessary information via the NW node site controller 520, i.e. the functions of the NW node site controller 520 is distributed wherein the NW node site controller 520 per se, at least partially, may be regarded as distributed, e.g. between controllers 514a, 514b, or processing elements 508a, 508b.

In the following, the functions related to inter-modulation interference detection will be described from the point of view that a first NW node 501a transmits a DL signal which may interfere with an UL signal to a second NW node 501b. This applies of course the other way too, but for the sake of brevity, the explanation is made from the above referenced point of view wherein the skilled reader readily understands how it will work both ways.

The second NW node 501b is arranged to detect an interference level on a transmission received on an associated uplink carrier frequency band for a subset of stations or UEs of a set of stations or UEs associated with the second NW node 501b. By these elements it is possible to determine whether the interference level indicates significant inter-modulation interference caused by transmissions made by the transmitter 506a, i.e. by collecting statistics and performing correlation and evaluating them. The controller(s), according to any of the task distributions demonstrated above, may thus be considered to perform the method according to any of the embodiments demonstrated with reference to FIG. 3 to enable collection of interference and signal levels for the statistics as demonstrated above, wherein the controller(s) is/are able to determine, by performing the correlations from the collected statistics, if significant inter-modulation issues caused by signals transmitted by the transmitter 506a exist. The controller(s) may further be arranged to, if "active" silence, as discussed above, is required on the uplink for the measurements, arrange than no schedule for an uplink transmission grant for the stations is made. The uplink transmission grant is valid for a future TTI. The controller 514b, which is connected to the transmitter 506b, may further be arranged to avoid the uplink transmission grant to the stations, and to limit transmissions on the downlink carrier frequency band at the future TTI such that reception may be made with limited PIM, and also such that measurements to collect desired statistics on inter-modulation interference is enabled on the uplink carrier frequency band.

Figure 1:
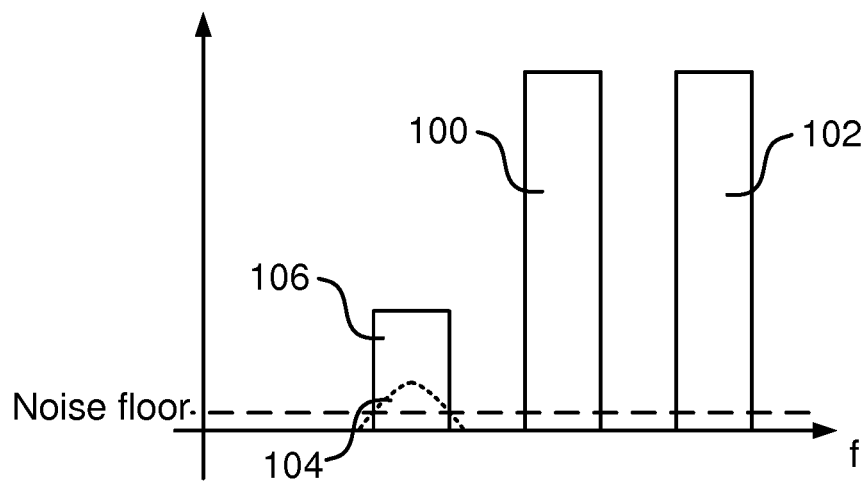
FIG. 1 schematically illustrates how inter-modulation issues may degrade a signal.
Figure 2:
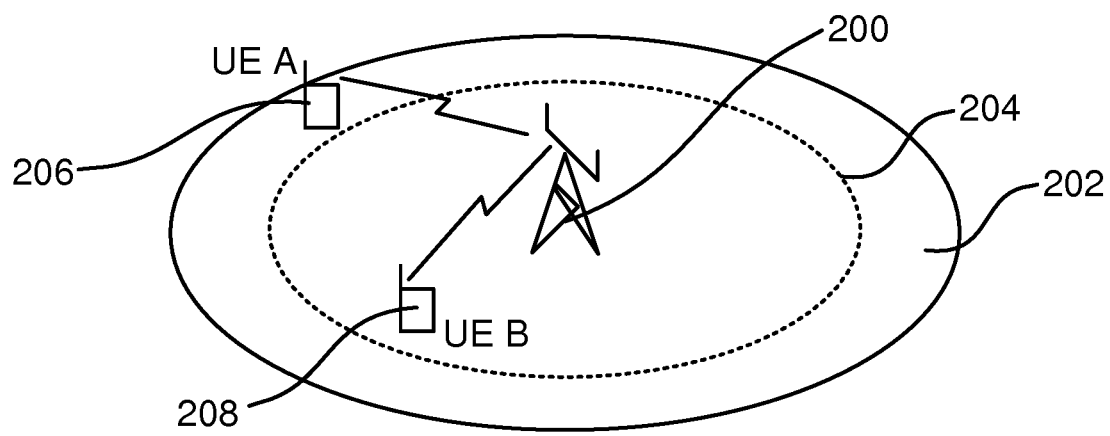
FIG. 2 schematically illustrates a base station operating a cell and how inter-modulation degradation may limit the range of the base station.

With the context of the network node sites demonstrated with reference to FIGS. 4 and 5, and the discussion about PIM and the example on how to detect PIM of FIGS. 1 to 3 in mind, an approach of handling such interference will now be demonstrated by a method and a controller where PIM is detected, the effect of the PIM is identified, and actions are taken to limit the effects of the PIM.

Figure 6:
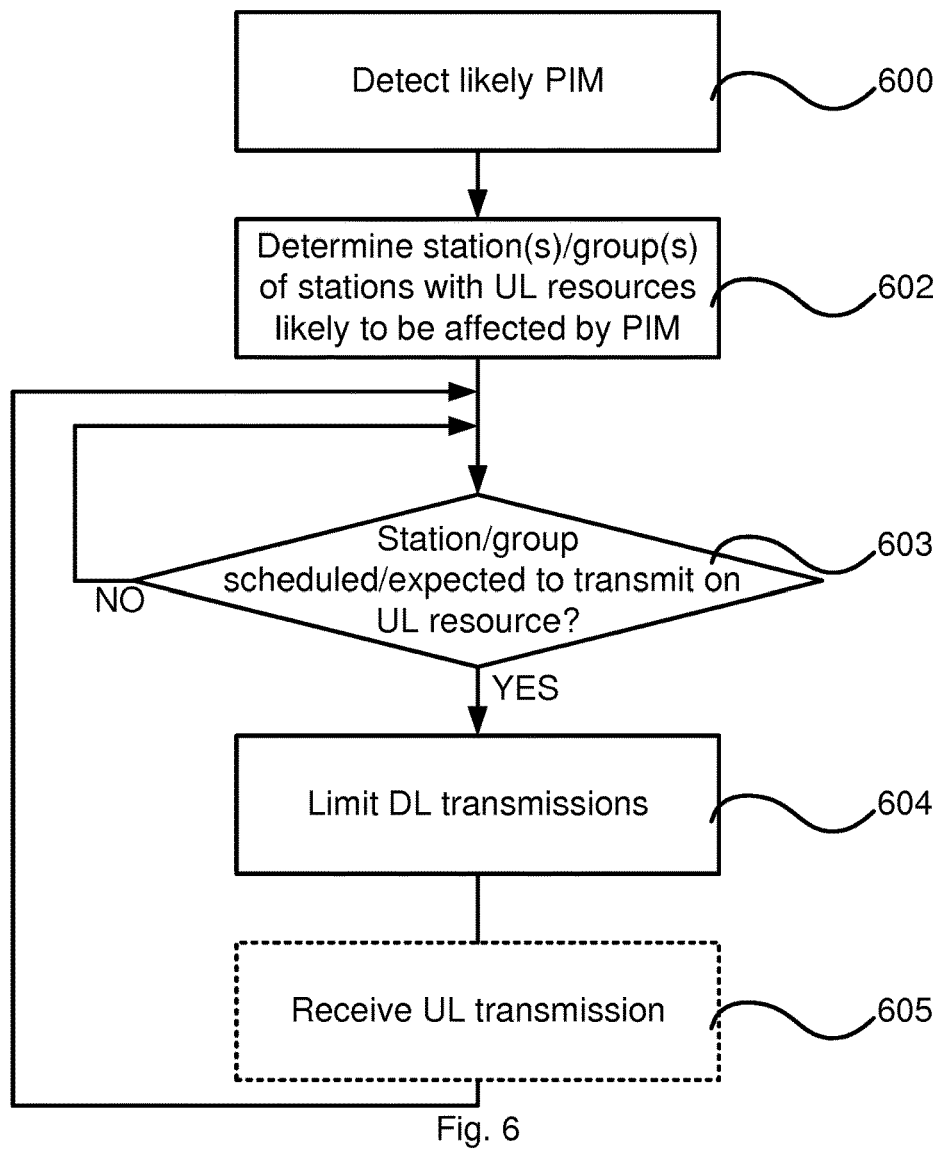
FIG. 6 is a flow chart schematically illustrating a method of handling interference according to an embodiment.

FIG. 6 is a flow chart schematically illustrating a method of handling interference according to an embodiment. It is detected 600 whether PIM is likely. This may for example be made as any of the variants that have been demonstrated with reference to FIG. 3. Several measurements may be made and analysed, e.g. including both measurements when a suspected interferer is making a full transmission (full power, full assignment of resources) and when the suspected interferer is making a minimal transmission (switched off, or at minimum power and/or with minimal resource assignment) where difference between the measurements may be considered. The measurements are preferably made by a receiver, e.g. using a receiver of a network node. One or more stations or groups of stations being a likely victim of PIM emanating from the transmissions are determined 602. A group may for example be a set of stations assigned a resource, e.g. a same subframe, for making uplink transmissions, e.g. for reporting. Here, "same subframe" may mean the actual same subframe and/or the same recurring subframe of the assigned resource. Different stations, or groups, may be assigned different levels of protection from PIM. This may for example be based on importance (for the system performance as a whole) of the network node being able to receive the transmissions.

The determination 602 of likely victims of PIM may simply be done by checking which stations having assigned uplink frequencies with a frequency relation to the transmit frequency where harmonics caused by PIM may be present. This information is preferably also used for selecting frequencies to be measured when making the detection 600. It is checked 603 whether the station(s) or group of stations identified in the determination 602 is scheduled or expected to do a transmission on the victim uplink resource. If not, the transmissions carry on as previously scheduled. If there is a scheduled or expected transmission on the victim uplink resource, downlink transmissions are limited 604 to limit the PIM effects on the uplink resources. The limitation may be made in different ways. According to one embodiment, the limitation efforts are depending on an assigned level of protection for the victim station(s) or group(s). Limiting downlink transmissions may include omitting a transmission, or adapting one or more of transmit power, the amount of content to be transmitted, resource block assignment for the transmission, etc. After the uplink transmissions 605 are finished, the downlink transmissions may return to normal operation until it is determined 603 that a new uplink transmission is coming from a victim station or group, and the downlink transmissions are limited 604 again, and so on. Occasionally, the detection 600 of likely PIM and determination 602 of station or groups affected may be re-performed for update.

FIG. 7 is a block diagram schematically illustrating a controller 700 according to an embodiment. The controller 700, which is briefly indicated with reference to FIGS. 4 and 5 in its operating context, comprises a detector 702 arranged to detect likely PIM, an analyser 704 arranged to determine a victim station or stations, or group or groups of stations (as demonstrated above), and a transmission control 706 which is arranged to limit downlink transmissions when the victim(s) are to send on the uplink resource. The transmission control 706 may limit the downlink transmissions by omitting transmission, or by reducing transmission power. The downlink transmission may also be limited by limiting the amount of content to be transmitted, e.g. by only transmitting mandatory data such as control data. The downlink transmission may also be limited by assigning resource blocks, e.g. within a broadband signal, such that PIM effects are limited at resource blocks used in the uplink transmission, which for example may be a narrow-band transmission. A combination of any of these may be used.

The detector 702 and analyzer 704 may use different techniques for estimating level of PIM and what victims may be according to any of the examples given above. The elements 702, 704, 706 of the controller 700 may interact with parts of respective network node, such as a receiver for making measurements and a transmitter (with its communication scheduler for some embodiments) for enabling the limitation of the downlink transmission. Furthermore, the elements 702, 704, 706 of the controller 700 may to a high degree rely on processing and thus on a processor, which may be one or more processors, separate for the elements 702, 704, 706 or common, separate for the controller 700 or as indicated for some embodiments above using a processor of a network node.

Figure 8:
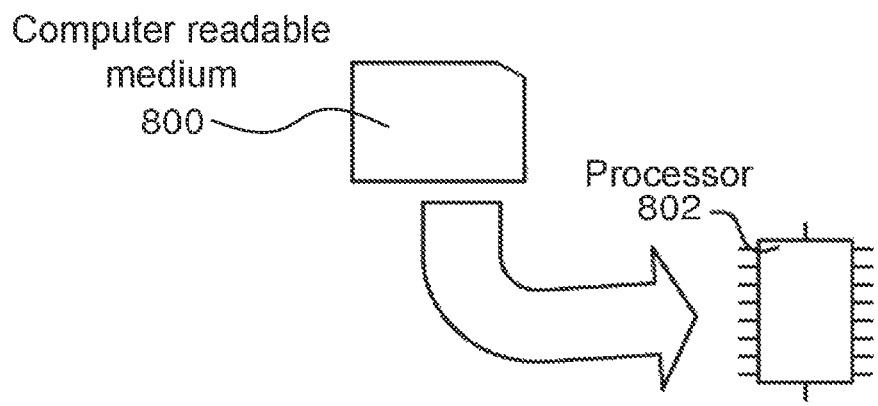
FIG. 8 schematically illustrates a computer-readable medium and a processing device.

The methods according to the present invention are suitable for implementation with aid of processing means, such as computers and/or processors, especially for the case where the elements demonstrated above, i.e. the detector, the analyser and the transmission control, comprises a processor handling the PIM detection, identification of the effects of the PIM, and limitation of the effects of the PIM. Therefore, there is provided computer programs, comprising instructions arranged to cause the processing means, processor, or computer to perform the steps of any of the methods according to any of the embodiments described with reference to FIG. 6. The computer programs preferably comprises program code which is stored on a computer readable medium 800, as illustrated in FIG. 8, which can be loaded and executed by a processing means, processor, or computer 802 to cause it to perform the methods, respectively, according to embodiments of the present invention, preferably as any of the embodiments described with reference to FIG. 6. The computer 802 and computer program product 800 can be arranged to execute the program code sequentially where actions of the any of the methods are performed stepwise. The processing means, processor, or computer 802 is preferably what normally is referred to as an embedded system. Thus, the depicted computer readable medium 800 and computer 802 in FIG. 8 should be construed to be for illustrative purposes only to provide understanding of the principle, and not to be construed as any direct illustration of the elements.

Figure 9:
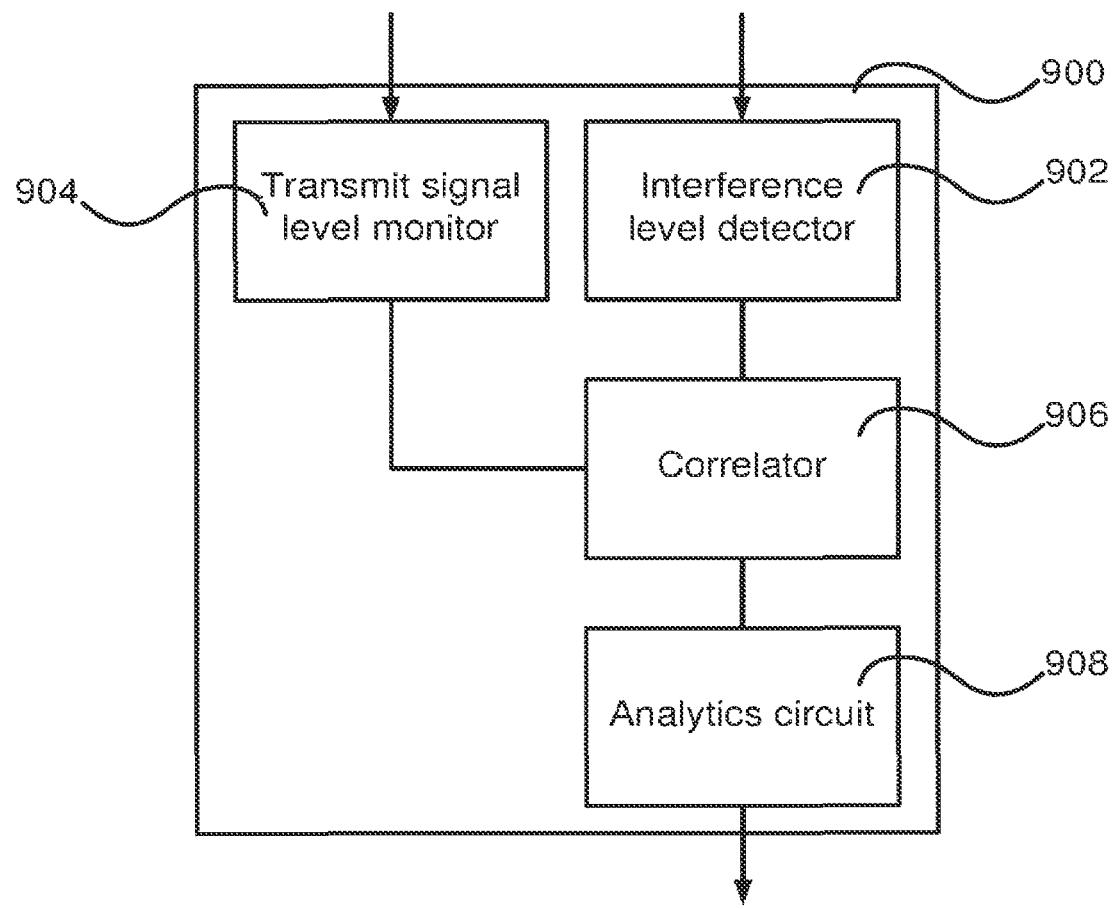
FIG. 9 is a block diagram schematically illustrating an example of a detector of a controller according to an embodiment.

FIG. 9 is a block diagram schematically illustrating a detector 900 according to an embodiment, which detector 900 is used in a controller according to one or more of the embodiments demonstrated above. The detector 900 comprises an interference level detector 902 which is arranged to receive signals from a receiver to determine a received input signal interference level on a suspected victim frequency. The detector 900 further comprises a transmit signal level monitor 904 which is arranged to determine a transmit signal level on downlink transmissions. The monitoring and detecting correspond in time such that evaluation is feasible. The interference level detector 902 and the transmit signal level monitor 904 provide respective data to a correlator 906, which, since the data corresponds in time, is arranged to correlate the data and provide information on correlations between transmission and interference levels. The correlations are provided to an analytics circuit 908 which is arranged to determine whether the interference is significantly caused by the transmissions, i.e. that PIM is likely. The determination may be made by comparing correlation data with a threshold. The detector 900 may do measurements over time to enable proper filtering, e.g. averaging, trend analysis, etc., to improve quality of the determination.

The invention claimed is:

1. A method of handling interference caused by intermodulation in a network node site comprising a set of network nodes for wireless communication with a set of stations, wherein the set of stations are wireless transceiver devices and communication from a network node of the set of network nodes to any of the set of stations is considered to be downlink communication and communication from said any of the set of stations is considered to be uplink communication, the method comprising:
   detecting likely passive intermodulation;
   determining at least one station of the set of stations having an uplink resource being likely to be affected by the detected likely passive intermodulation; and
   limiting downlink transmission, when the determined at least one station is scheduled or expected to transmit on the uplink resource, on a downlink resource likely to be affecting the uplink resource by the detected likely passive intermodulation, wherein limiting the downlink transmission comprises adapting any one or more of: scheduled content to transmit; and resource block assignment for the downlink transmission.

2. The method of claim 1, wherein determining the at least one station comprises forming at least one group of stations, and wherein stations of the at least one group of stations are assigned the uplink resource being likely to be affected by the detected likely passive intermodulation.

3. The method of claim 2, wherein a plurality of groups of stations are determined, wherein each group of the plurality of groups of stations is assigned a level of protection, and wherein limiting the downlink transmission is performed according to the assigned level of protection.

4. The method of claim 2, wherein the at least one group of stations comprises the stations which are assigned to report in a same subframe of the uplink resource.

5. The method of claim 1, wherein limiting the downlink transmission further comprises adapting transmit power.

6. The method of claim 1, wherein limiting the downlink transmission further comprises omitting the downlink transmission when the determined at least one station is scheduled or expected to transmit on the uplink resource.

7. The method of claim 1, wherein detecting the likely passive intermodulation comprises providing an indication of the likely passive intermodulation when the interference caused by the inter-modulation is determined to be present based on a measurement, a calculation of an estimate of the passive intermodulation from the measurement, and a comparison of the estimated passive intermodulation with a threshold.

8. The method of claim 7, wherein the calculation of the estimate of the passive intermodulation comprises correlating measured interference levels at full transmit power level for the network node and received input signal interference levels at minimum transmit power level for the network node, and wherein the estimate of the passive intermodulation is based on differences at different transmit power levels.

9. The method of claim 1, wherein detecting the likely passive intermodulation comprises:
determining a received input signal interference level on at least a part of communication resources for the uplink communication;
determining a transmitted signal level on at least a part of communication resources for the downlink communication, wherein the at least part of communication resources for the downlink communication corresponds in time with the at least part of communication resources for the uplink communication;
correlating statistics from the determined received input signal interference level and the determined transmitted signal level; and
determining whether the interference caused by the inter-modulation is present based on the correlation.

10. A non-transitory computer readable medium comprising a computer program comprising instructions which, when executed on a processor of a controller at a network node site, cause the controller to perform a method of handling interference caused by inter-modulation in the network node site, wherein the network node site comprises a set of network nodes for wireless communication with a set of stations, and wherein the set of stations are wireless transceiver devices and communication from a network node of the set of network nodes to any of the set of stations is considered to be downlink communication and communication from said any of the set of stations is considered to be uplink communication, the method comprising:
detecting likely passive intermodulation;
determining at least one station of the set of stations having an uplink resource being likely to be affected by the detected likely passive intermodulation; and
limiting downlink transmission, when the determined at least one station is scheduled or expected to transmit on the uplink resource, on a downlink resource likely to be affecting the uplink resource by the detected likely passive intermodulation, wherein limiting the downlink transmission comprises adapting any one or more of: scheduled content to transmit; and resource block assignment for the downlink transmission.

11. A controller arranged to operate with a network node site comprising a set of network nodes for wireless communication with a set of stations, wherein the set of stations are wireless transceiver devices and communication from a network node of the set of network nodes to any of the set of stations is considered to be downlink communication and communication from said any of the set of stations is considered to be uplink communication, and wherein the controller comprises a processor configured to:
detect likely passive intermodulation;
determine at least one station of the set of stations having an uplink resource being likely to be affected by the detected likely passive intermodulation; and
limit downlink transmission, when the determined at least one station is scheduled or expected to transmit on the uplink resource, on a downlink resource likely to be affecting the uplink resource by the detected likely passive intermodulation, wherein, to limit the downlink transmission, the processor is configured to adapt any one or more of: scheduled content to transmit; and resource block assignment for the downlink transmission.

12. The controller of claim 11, wherein the processor is configured to determine the at least one station by forming at least one group of stations, and wherein stations of the at least one group of stations are assigned the uplink resource being likely to be affected by the detected likely passive intermodulation.

13. The controller of claim 12, wherein a plurality of groups of stations are determined, wherein each group of the plurality of groups of stations is assigned a level of protection, and wherein the processor is configured to limit the downlink transmission according to the assigned level of protection.

14. The controller of claim 12, wherein the at least one group of stations comprises the stations which are assigned to report in a same subframe of the uplink resource.

15. The controller of claim 11, wherein the processor is further configured to limit the downlink transmission by adapting transmit power.

16. The controller of claim 11, wherein the processor is further configured to limit the downlink transmission by omitting the downlink transmission when the determined at least one station is scheduled or expected to transmit on the uplink resource.

17. The controller of claim 11, wherein the processor is configured to detect the likely passive intermodulation by providing an indication of the likely passive intermodulation when the interference caused by the inter-modulation is determined to be present based on a measurement, a calculation of an estimate of the passive intermodulation from the measurement, and a comparison of the estimated passive intermodulation with a threshold.

18. The controller of claim 17, wherein the processor is configured to calculate the estimate of the passive intermodulation by correlating measured interference levels at full transmit power level for the network node and received input signal interference levels at minimum transmit power level for the network node, and wherein the estimate of the passive intermodulation is based on differences at different transmit power levels.

19. The controller of claim 11, wherein the processor is configured to detect the likely passive intermodulation by being configured to:
determine a received input signal interference level on at least a part of communication resources for the uplink communication;
determine a transmit signal level on at least a part of communication resources for the downlink communication, wherein the at least part of communication resources for the downlink communication corresponds in time with the at least part of communication resources for the uplink communication;

correlate statistics from the determined received input signal interference level and the determined transmitted signal level; and determine whether the interference caused by the intermodulation is present based on the correlation.

20. A network node site, comprising:

one or more network nodes for wireless communication with a set of stations; and the controller of claim 11.

* * * * *